United States Patent
Hu et al.

(10) Patent No.: US 11,353,656 B1
(45) Date of Patent: Jun. 7, 2022

(54) ON-CHIP POLARIZATION CONTROL

(71) Applicant: SiLC Technologies, Inc., Monrovia, CA (US)

(72) Inventors: Shuren Hu, Arcadia, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 0 days.

(21) Appl. No.: 17/105,193

(22) Filed: Nov. 25, 2020

(51) Int. Cl.
| | |
|---|---|
| *G02B 6/126* | (2006.01) |
| *G02B 6/125* | (2006.01) |
| *G01S 7/481* | (2006.01) |
| *G01S 7/499* | (2006.01) |
| *G02B 6/122* | (2006.01) |
| *G02B 6/12* | (2006.01) |

(52) U.S. Cl.
CPC ............ *G02B 6/126* (2013.01); *G01S 7/4818* (2013.01); *G01S 7/499* (2013.01); *G02B 6/125* (2013.01); *G02B 6/1228* (2013.01); *G02B 2006/12061* (2013.01); *G02B 2006/12097* (2013.01)

(58) Field of Classification Search
CPC ................................. G02B 6/125; G02B 6/126
See application file for complete search history.

(56) References Cited

U.S. PATENT DOCUMENTS

2003/0031407 A1 * 2/2003 Weisberg ........... G02B 6/02304
385/39
2017/0003451 A1 * 1/2017 Ma ......................... G02B 6/122

FOREIGN PATENT DOCUMENTS

| CN | 111338025 A | * | 6/2020 | |
| WO | WO-9711396 A1 | * | 3/1997 | ......... G02B 6/12011 |

* cited by examiner

*Primary Examiner* — Charlie Y Peng
(74) *Attorney, Agent, or Firm* — Gavrilovich, Dodd & Lindsey LLP

(57) ABSTRACT

An on-chip polarizer for polarization filtering is described herein. The polarizer includes a rib waveguide on a supporting substrate, wherein the rib waveguide and the substrate may respectively comprise different materials. The rib waveguide may include a strip positioned over a slab of the same material. The strip may include a curvature along an optical propagation direction. In some embodiments, the curvature may include two bends that together form an approximately mirrored S-shaped curvature. The waveguide curvature may be configured to selectively guide an optical mode associated with a first polarization state while filtering-out another optical mode associated with a second polarization state. In some embodiments, the polarizer may allow propagation of a near lossless transverse magnetic (TM) mode while selectively radiating away a lossy transverse electric (TE) mode.

10 Claims, 8 Drawing Sheets

800

ON-CHIP POLARIZATION CONTROL

FIELD

The invention relates to on-chip polarization control in photonic integrated circuits. In particular, the invention relates to on-chip polarization rotators and polarizers.

BACKGROUND

Advancements in photonic integrated circuit (PIC) processes and devices have enabled the low loss, on-chip integration of a vast array of photonic components such as waveguides, splitters, couplers, and interferometers. With such advances, new applications of PICs are emerging in various fields such as machine vision, autonomous vehicles, remote surveillance, augmented reality (AR), virtual reality (VR), and medical imaging. The increasing performance requirements for such new applications require increasingly adaptable on-chip polarization control techniques. For example, PICs in some light detection and ranging systems (LIDARs) rely on polarization-sensitive signal processing. This requires integration of traditional photonic components, such as waveguides, couplers, and splitters, with on-chip polarizers for developing chip-scale optical signal processing functions.

Large waveguide silicon photonic platforms that comprise waveguides over a micron in width are less susceptible to process related variations and provide low loss optical signal processing. Some LIDAR systems, such as frequency modulated continuous wavelength (FMCW) LIDARs, are based on large waveguide silicon platforms. Such systems are capable of polarization-sensitive target detection and increasingly rely on on-chip polarization control techniques. For example, FMCW LIDARs may detect reflected light of transverse electric (TE) and transverse magnetic (TM) polarizations and process TE-polarized and TM-polarized signals separately. However, in order to reduce PIC complexity and reduce a total number of photonic components, TM-polarized signals may be converted into TE-polarized signals via on-chip polarization rotators and polarizers. The rest of the optical signal processing circuitry on the PIC can then be optimized for the TE-polarized signals with no need for designing and fabricating circuitry for both TE and TM-polarized signals. This approach can eliminate the need for TM-polarized laser input signals for FMCW based LIDAR systems by relying on only TE-polarized laser input signals.

SUMMARY

This summary is not intended to identify critical or essential features of the disclosures herein, but instead merely summarizes certain features and variations thereof. Other details and features will also be described in the sections that follow.

Some of the features described herein relate to on-chip polarization control of optical signals. For example, a photonic integrated circuit (PIC) can include a polarization filter for allowing propagation of a chosen optical mode while rejecting propagation of another optical mode. In some instances, the chosen optical mode may be a transverse electric (TE) mode while in other instances, the chosen optical mode may be a transverse magnetic (TM) mode. The on-chip polarization filter may be designed and fabricated to support near loss less transmission of the chosen optical mode. Propagation of the unsupported optical mode may be characterized by high optical loss.

The on-chip polarization filter may be based on a rib waveguide including a strip positioned on top of a supporting slab structure. The strip portion of the polarization filter may be characterized by an approximately mirrored s-shaped curvature. In some instances, the curvature may comprise of two adjacent bends, each approximating a quarter-circle or less. In some embodiments, the polarization filter may include tapers on either end for tapering the propagating optical mode(s). For example, a first taper section between a straight waveguiding portion and the first bend may transmit the propagating optical modes from the straight waveguiding portion and into the first bend of the polarization filter. A second taper section may then transmit the chosen optical mode from the second bend and into another straight waveguiding portion of the PIC. The tapered sections may ensure low loss optical mode coupling and propagation between the traditional waveguiding sections and the polarization filter.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
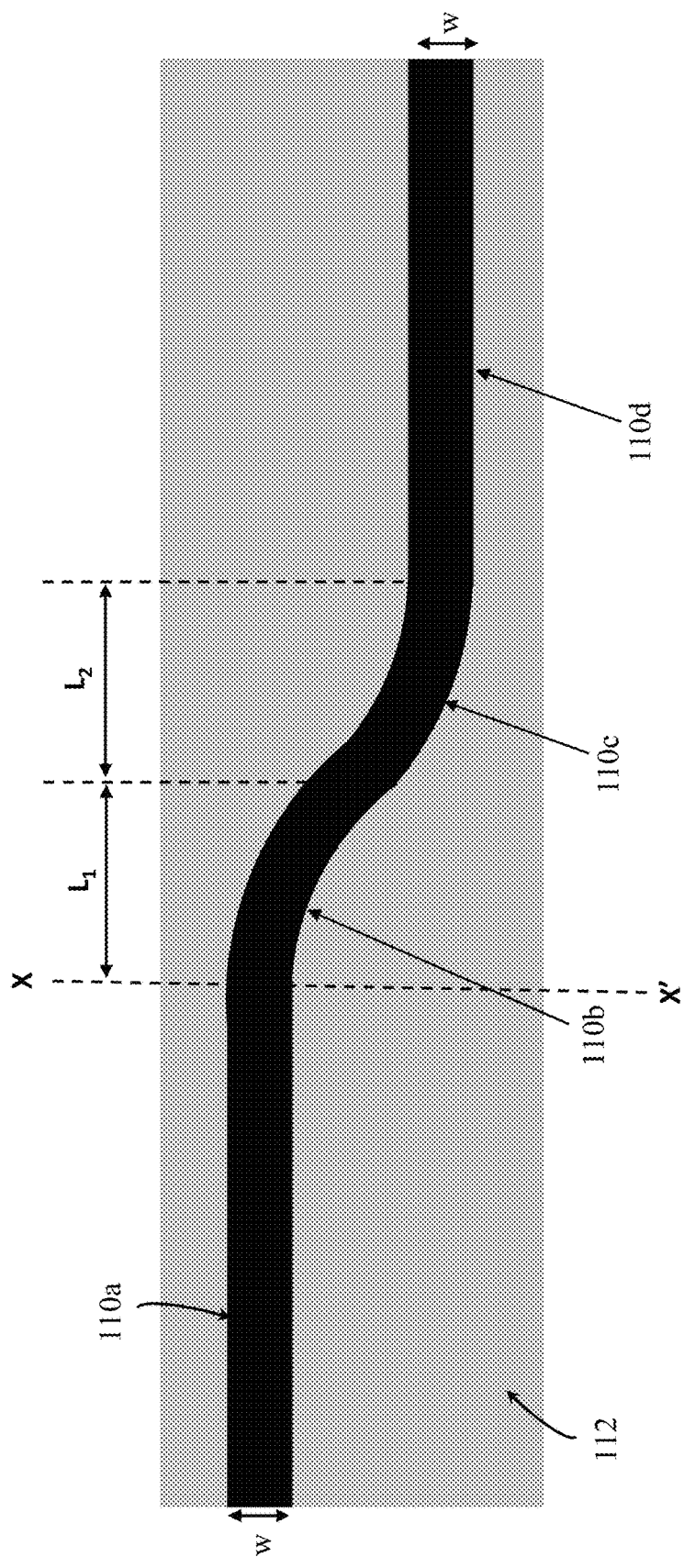
FIG. 1 shows an on-chip polarizer in accordance with various embodiments described herein.

Example embodiments will now be described more fully with reference to the accompanying drawings. Many alternate forms may be embodied, and example embodiments should not be construed as limited to example embodiments set forth herein. In the drawings, like reference numerals refer to like elements.

As used herein, the term "and/or" includes any and all combinations of one or more of the associated items. Unless specifically stated otherwise, or as is apparent from the discussion, terms such as "processing" or "computing" or "calculating" or "determining" or "displaying" or the like, refer to the action and processes of a computing system, or similar electronic computing device, that manipulates, and transforms data represented as physical, electronic quantities within the computing system's registers and memories into other data similarly represented as physical quantities within the computing system's memories or registers or other such information storage, transmission or display devices.

Electronics and other processing elements may include one or more digital signal processors (DSPs), application-specific integrated circuits (ASICs), field programmable gate arrays (FPGAs), central processing units (CPUs), or the like. Example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. When implemented in software, a processor(s) may be programmed to perform the necessary tasks, thereby being transformed into special purpose processor(s) or computer(s).

FIG. 1 shows a top-view of an on-chip polarization filter 100. The polarization filter 100 may include one or more traditional waveguiding portions such as 110a and 110d that interface with a curved section. The polarization filter and the waveguiding portions may be based on a rib waveguide configuration that includes a strip on a supporting slab structure. As shown in FIG. 1, the curved section may include two adjacent bends 110b and 110c, that are associated with the strip portion on the supporting slab structure. Each bend may be characterized by a respective bend radius and horizontal length. For example, the first bend may comprise a horizontal length L1 and a bend radius R1. The second bend may comprise a horizontal length L2 and a bend radius R2. Each bend radius, such as R1 and R2, may vary between approximately 1000 µm and 8000 µm.

Figure 2:
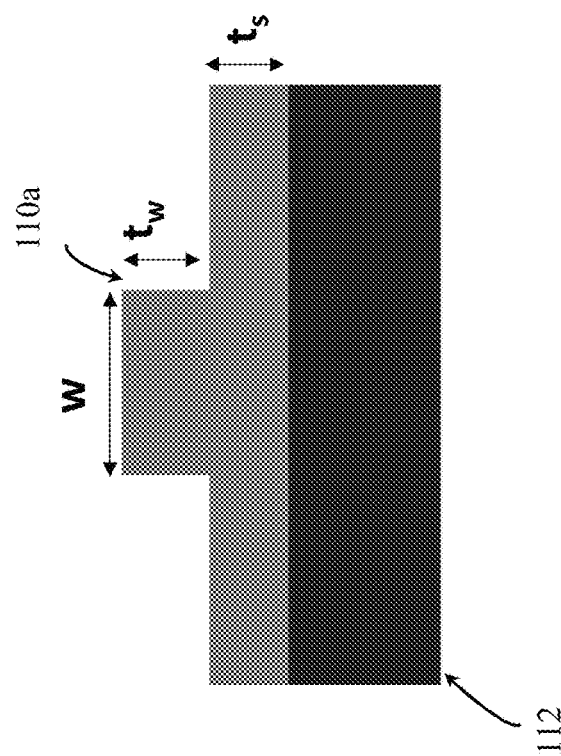
FIG. 2 shows a cross-sectional view of the on-chip polarizer of FIG. 1 in accordance with various embodiments described herein.

In some instances, the parameters for the first bend and the second bend may be approximately equal. For example, R1 may be approximately equal to R2 and may be approximately 5500 µm. In some instances, the length of the first bend, L1, may be approximately equal to the length of second bend, L2. The polarization filter and/or any waveguiding portions that interface with the polarization filter may be configured with a width, w, and a height, $t_w$, as shown in FIG. 2 described below. The width, w, may vary between approximately 1.5 µm and 2 µm and the height, $t_w$, may vary between approximately 1 µm and 1.5 µm. The height of the remaining slab portion may depend on wafer specifications and/or fabrication processes. For example, the height of the slab portion may be approximately 1.8 µm. In some instances, the rib waveguide may be a silicon rib waveguide with an underlying buried oxide (BOX) layer 112.

FIG. 2 shows a cross-section of the polarization filter of FIG. 1 along line X-X'. The supporting wafer structure 112 may comprise height, $t_s$, that varies between 1 and 1.5 µm. The width of the waveguiding structure that comprises the polarization filter may vary between 1.5 and 2 µm as described in FIG. 1. In some instances, the width may be approximately 1.5 µm. As described earlier in FIG. 1, the polarization filter and the interfacing straight waveguide sections may be of the same width and height.

Figure 3A:
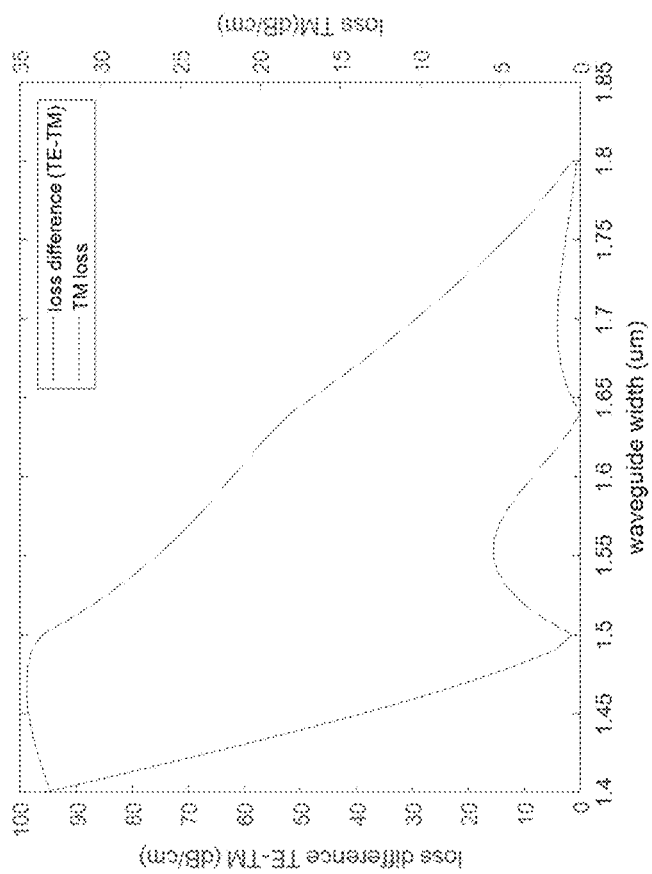
FIG. 3A shows a plot of optical loss versus waveguide width for TE-polarized and TM-polarized signals in accordance with various embodiments described herein.

FIG. 3A shows a simulated plot of optical loss versus rib width, w, for a fundamental $TE_0$ and a fundamental $TM_0$ mode. A bend radius associated with the first bend section and the second bend section may be approximately 5500 µm. As the waveguide width increases, the optical loss for both the $TE_0$ and the $TM_0$ decreases. However, the optical loss for the $TM_0$ mode is seen to decrease substantially faster than that for the $TE_0$ mode. For example, for a waveguide width greater than approximately 1.5 µm, the $TM_0$ mode is seen to suffer negligible optical loss while the $TE_0$ mode is seen to suffer from an optical loss of approximately 80 dB/cm. Accordingly, a polarization filter capable of near loss less $TM_0$ propagation and lossy $TE_0$ propagation can be designed based on selecting a waveguide width, w, that is equal to or greater than approximately 1.5 µm with a bend radius, Rb, of approximately 5500 µm. As the two modes propagate through the polarization filter, the $TM_0$ mode can be guided with near loss less transmission while the $TE_0$ mode can be significantly suppressed due to high optical losses.

Figure 3B:
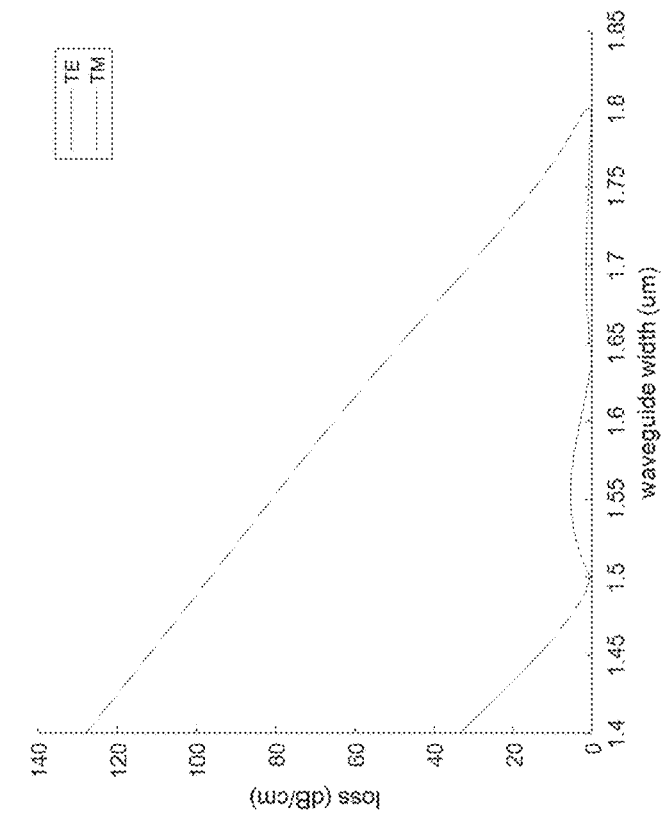
FIG. 3B shows a plot of a difference in optical loss between TE-polarized and TM-polarized signals versus waveguide width in accordance with various embodiments described herein.

FIG. 3B shows a simulated plot of a loss-differential between the $TE_0$ and the $TM_0$ mode. For a waveguide width, w, between 1.4 µm and 1.5 µm, the TE optical mode may have a high transmission loss. Thus, most of the TE polarized mode is filtered-out along the length of the on-chip polarization filter. For a similar waveguide width of between 1.4 µm and 1.5 µm, the $TM_0$ mode optical loss is seen to drastically decrease as described earlier with respect to FIG. 3A. The optical loss for the $TM_0$ continues to remain significantly lower than that for the $TE_0$ mode for waveguide widths greater than 1.5 µm and up to 1.8 µm. Thus, the $TM_0$ mode is the dominant optical mode exiting the on-chip polarization filter.

Figure 4B:
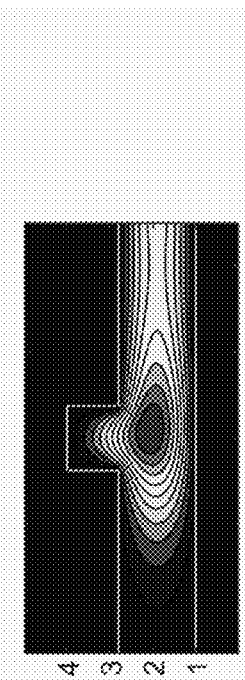
FIGS. 4A and 4B show plots of the electric field profile for fundamental TM and the fundamental TE modes respectively, for an exemplary polarizer, in accordance with various embodiments described herein.
Figure 4A:
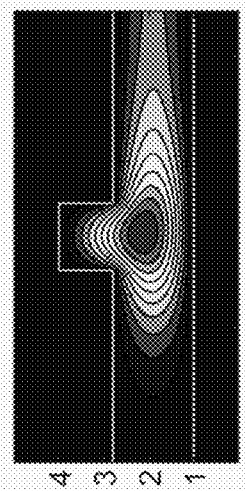

FIG. 4A shows a simulated $TM_0$ mode field distribution for a bend radius, Rb, of approximately 5500 µm and a waveguide width, w, of approximately 1.5 µm. Most of the mode is seen to be concentrated within and directly below the waveguide region. For example, a majority of the $TM_0$ mode may be confined within the waveguide region and within a slab portion that lies directly beneath the waveguide region. The mode field distribution may be well confined with nearly no leaky components.

FIG. 4B shows a simulated $TE_0$ mode field distribution for a bend radius, Rb, of approximately 5500 µm and a waveguide width, w, of approximately 1.5 µm. A significant portion of the $TE_0$ mode is seen to be unconfined to the waveguide or the slab portion. For example, a significant portion of the $TE_0$ mode is seen to be leaking away into the slab region of the polarization filter. Accordingly, the polarization filter can enable high fidelity transmission of the $TM_0$ mode while preventing transmission of the $TE_0$ mode.

Figure 5B:
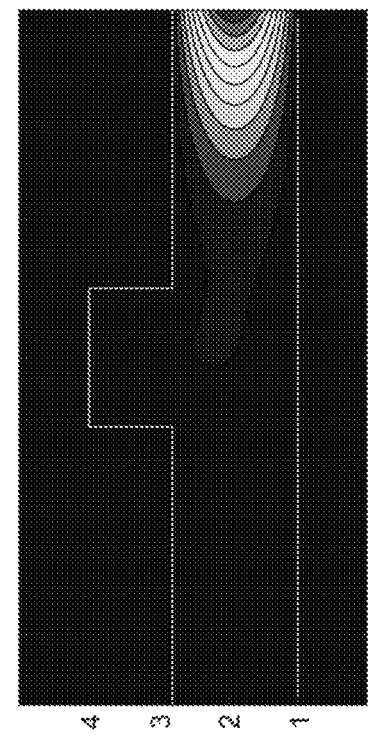
FIGS. 5A and 5B show plots of the electric field profile for fundamental TM and the fundamental TE modes respectively, for a different polarizer, in accordance with various embodiments described herein.
Figure 5A:
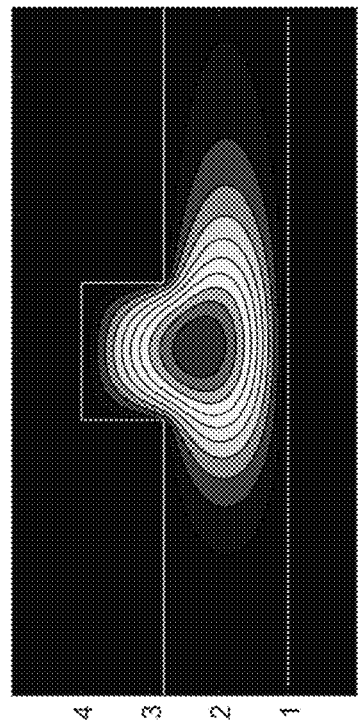

FIG. 5A shows a simulated $TM_0$ mode field distribution for an on-chip polarization filter with a tighter bend radius, Rb, of approximately 4000 µm and a larger waveguide width, w, of approximately 2 µm as compared to the configuration described earlier in FIGS. 4A and 4B. A more aggressive curvature of both sections of the polarization filter may effectively filter out the $TE_0$ mode within a shorter propagation distance due to much higher optical losses as seen in FIG. 5B that shows a simulated $TE_0$ mode field distribution for the same waveguide configuration of FIG. 5A. A slight increase in the waveguide width from 1.5 µm to approximately 2 µm can ensure low loss transmission of the $TM_0$ mode.

Figure 6:
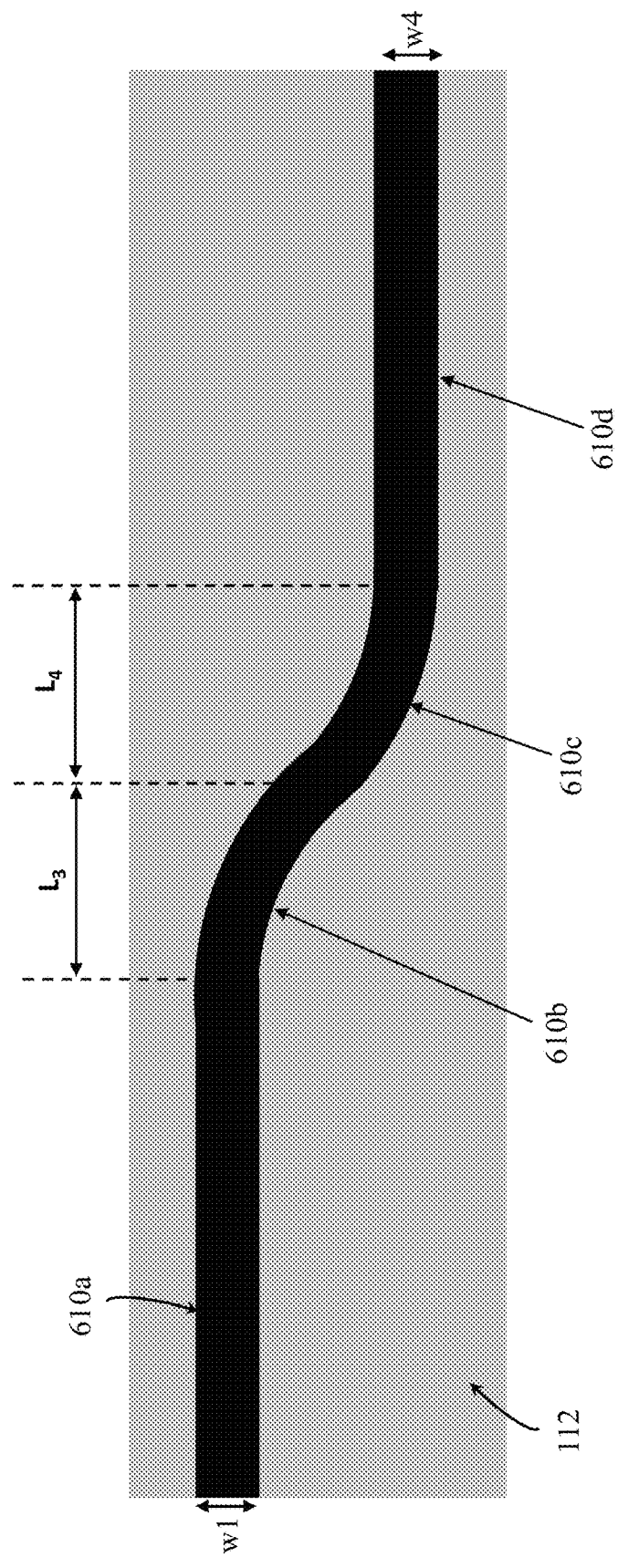
FIG. 6 shows an example illustration of an on-chip polarizer in accordance with various embodiments described herein.

FIG. 6 shows an example embodiment of an on-chip polarization filter 600. The polarization filter may comprise a rib waveguide of varying strip widths (e.g., 610b and 610c) and/or tapers (not shown) for interfacing with the straight waveguiding sections 610a and 610d. For example, the on-chip polarization filter may include a first bend section 610b of length, L3, and width $w_2$. The first bend section may then interface with the second bend section 610c via a taper for preventing any mode mismatch between the two sections. In some embodiments, the second bend section may have a length L4 and a width $w_3$. The second bend section may interface with a straight waveguide section 610*d* of width $w_4$ via another taper for prevention of mode mismatch.

In some embodiments, dimensions for the widths may be $w_1=w_2=2$ μm and $w_3=3$ μm with a tapered rib waveguiding portion between the first bend and the second bend with a gradually increasing width from 2 μm to 3 μm. As described earlier with respect to FIG. 1, the rib waveguide includes a supporting slab structure and the rib waveguide may be positioned on another underlying structure, such as a BOX layer, 112. Each strip may have a respective height of approximately 1.2 μm. The supporting slab thickness underneath the strip may be approximately 1.8 μm. The rib waveguide may be configured to transmit the TE mode with an optical loss greater than 60 dB/cm for bend radii of approximately 5500 μm, $w_2=2$ μm, and $w_3=3$ μm.

In some other embodiments, a taper section may be present between 610*a* and 610*b* if there is a width mismatch between the respective strip portions of the waveguides 610*a* and 610*b*. Similarly, another taper section may be present between 610*c* and 610*d* if there is a width mismatch between the respective strip portions of the waveguides 610*c* and 610*d*.

Figure 7:
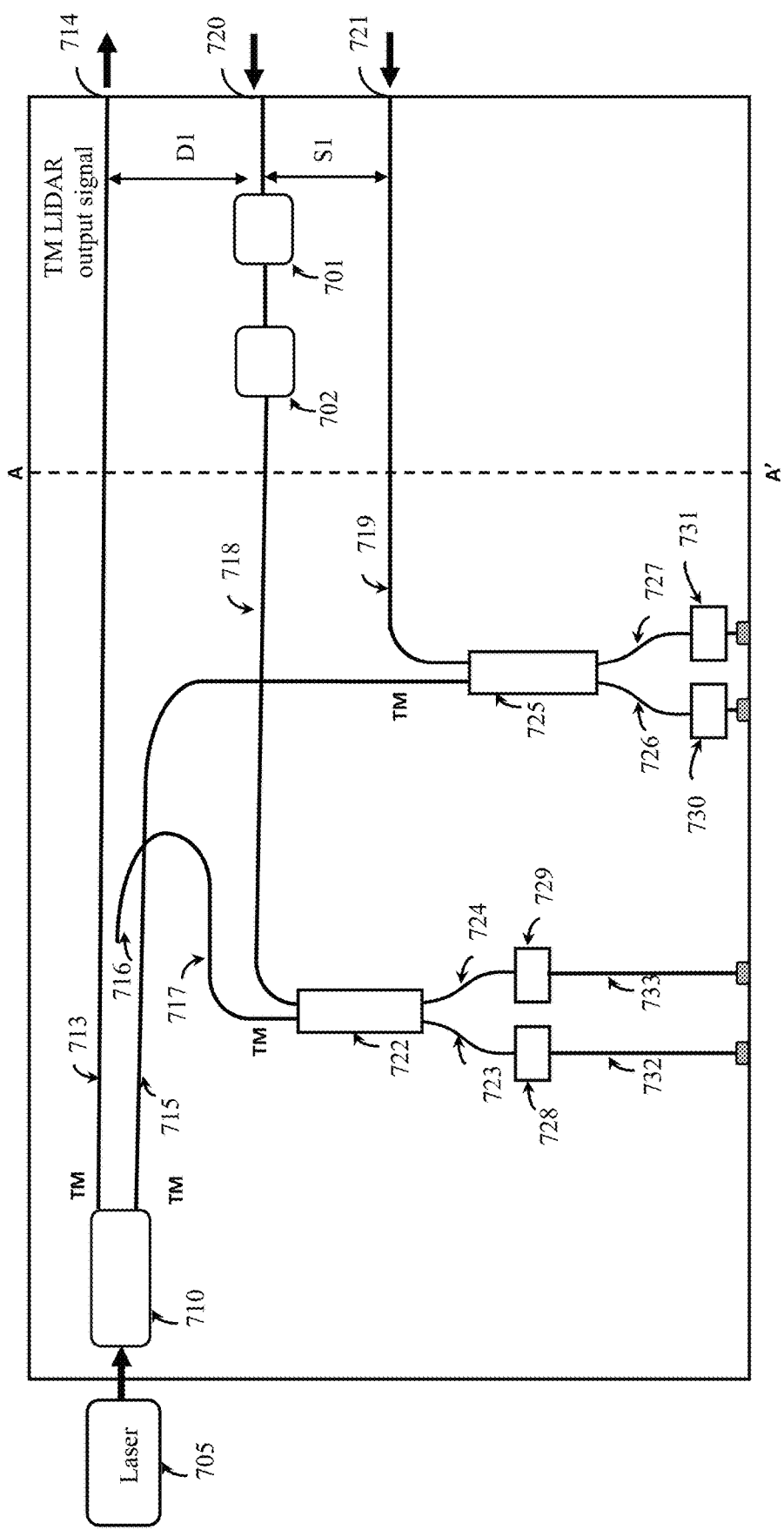
FIG. 7 shows an exemplary application of an on-chip polarizer in a LIDAR chip in accordance with various embodiments described herein.

FIG. 7 shows a top view of a LIDAR chip 700 incorporating polarization-based processing of LIDAR signals. The chip may include a multiple input waveguide configuration with each waveguide respectively corresponding to a particular polarization state of an incoming LIDAR signal. The LIDAR chip may include a light source 705 (e.g., laser) and a plurality of photonic components such as, a polarization rotator 701, a polarization filter 702, an output waveguide 713, an output facet 714, a first input waveguide 718, a second input waveguide 719, a first input facet 720, a second input facet 721, a first reference waveguide 717, a second reference waveguide 715, a first light-combining component 722, a second light-combining component 725, and splitters 710 and 716. In some instances, the light source may be off-chip. For a TE-polarized laser source, a polarization rotator may be used to convert the TE-polarized light into TM-polarized light either in an off-chip or on-chip configuration with the laser correspondingly located either located off-chip or on-chip.

In some instances, the LIDAR chip may include pairs of light sensors with each pair arranged in a balanced photodetector configuration. Each pair of light sensors can convert the respective optical beat signal from the corresponding light-combining component into an electrical beat signal. The electrical beat signals may be transmitted from the light sensor pairs to off-chip processing circuits via electrical signal lines (e.g., 732 and 733) that each terminate at an edge of the chip.

The first input waveguide 718 may be positioned away from the output waveguide 713 by a first predetermined distance (D1) and spaced apart from the second input waveguide by a first separation distance (S1). In some embodiments, the first predetermined distance may vary between 50 nm and 10 μm while the first separation distance may vary between a few microns and 200 μm. Various parameters may affect a selection of D1 including at least one of the range of operation (e.g., short-range <10 m, mid-range 10 m up to 50 m, and long-range >50 m), the wavelength range of operation (e.g., 1200 nm to 1320 nm, 1400 nm to 1590 nm, and 1900 to 7050 nm), the chirp duration, the chirp rate, the scanning module 106 parameters, specifications of the lens and/or collimators used to focus the optical signals (e.g., the LIDAR output signal, the first LIDAR input signal, and the second LIDAR input signal) to-and-from the LIDAR chip. The first separation distance, S 1, may depend on the type of polarization separation incorporated into the optics adjacent to the PIC.

The output waveguide 713 may couple light from the laser 705. The coupled laser light may be transmitted to an output facet 714 via the output waveguide that terminates at the output facet. The laser light emitted from the output facet may be referred to as the outgoing LIDAR signal or the LIDAR output signal interchangeably. The output facet may be positioned at an edge of the LIDAR chip. The output facet may be referred to as a terminating facet associated with the output waveguide 713. The LIDAR chip of FIG. 7 may be associated with the LIDAR chips described in related applications bearing application Ser. Nos. 16/931,444 and 17/062,618 disclosed herein in their entirety.

In some embodiments, the LIDAR chip may include an amplifier positioned along the output path of the LIDAR output signal and before the output facet 714. For example, the output waveguide 713 may carry the LIDAR output signal to the amplifier and an amplified LIDAR output signal may then exit the LIDAR chip from the output facet. Electronics (not shown) may be configured to control the amplifier operation and/or control a power of the LIDAR output signal. Examples of amplifiers include, but are not limited to, Erbium-doped fiber amplifiers (EDFAs), Erbium-doped waveguide amplifiers (EDWAs), and Semiconductor Optical Amplifiers (SOAs). In some embodiments, the amplifier may be a discrete component that is attached to the chip. The discrete amplifier may be positioned at any location on the LIDAR chip along the path of the LIDAR output signal. In some embodiments, all or a portion of the amplifier may be fabricated as along with the LIDAR chip as an integrated on-chip component. The LIDAR chip may be fabricated from various substrate materials including, but not limited to, silicon dioxide, indium phosphide, and silicon-on-insulator (SOI) wafers. Examples of splitters 710 and 716 include, but are not limited to, y-junctions, optical couplers, and MMIs.

In some embodiments, optics, such as birefringent crystals, polarization splitters, polarization rotators, lenses, collimator(s), and/or mirror(s) may be positioned off-chip. A scanning module may be used to steer the incoming and/or outgoing LIDAR optical signals. For example, a first LIDAR input signal may be split into its corresponding TE and TM components by off-chip optics. Each of these components may then couple into the PIC via respective input facets 720 or 721. In some instances, a TE component of the first LIDAR input signal may couple into the PIC via the first input facet 720. A TM component of the first LIDAR input signal may then couple into the PIC via the second input facet 721.

In order to perform either all-TM or all-TE based optical signal processing, the PIC may use an on-chip polarization rotator 701 and an on-chip polarization filter 702. As described earlier, this approach may simplify and/or reduce a number of optical components needed. For example, a single-polarization light source matched to the polarization of the on-chip signal processing components may be sufficient. This avoids the need for converting the single-polarization laser input into a dual-polarization (e.g., TE and TM) input signal.

The polarization rotator 701 may convert the TE component of the first LIDAR input signal into a TM signal. The polarization filter 702 may then filter out any remaining TE component so that a purely TM signal propagates along the waveguide 718 for coupling with the first light-combining component 722. The light-combining components may include multi-mode interference devices (MMIs), adiabatic splitters, and/or directional couplers. In some embodiments, the light-combining components may be 2×2 MMI devices. The functions of the illustrated light-combining components may be performed by more than one optical component.

The splitter 716 may be positioned sufficiently close to the output waveguide 713 to enabling coupling of light from the output waveguide 713 into the reference waveguide 717. The portion of the laser signal transmitted to the reference waveguide may be referred to as a reference signal. For example, the first reference waveguide 717 carries the first reference signal to the first light-combining component 722. The second reference waveguide 715 may carry the second reference signal to the second light-combining component 725.

The TM signal component and the TM reference signal may then interfere to generate a first beat signal within the first light-combining component 722. Input waveguide 719 can couple the original TM component of the first LIDAR input signal, as received, with the second light-combining component 725. The output of the second light-combining component 725, in this case, is a second beat signal that may be based on the interference between the original TM component and the TM reference signal. Accordingly, the PIC performs TM-based optical signal processing after ensuring that any received TE-polarized component of a LIDAR input signal is converted into its corresponding TM-polarized component by using a combination of an on-chip polarization rotator and polarization filter.

In other embodiments, a TM component may couple into the PIC via the first input facet while a TE component may couple into the PIC via the second input facet. In this case, the polarization rotator and the polarization filter may be positioned on the second input waveguide 719 to convert the TE component into its corresponding TM signal.

In some embodiments, there may be a phase shift (e.g., 0 to $\pi$) between output light signals of a first arm and a second arm of each of the MMIs. The output light signals associated with the two arms of the first MMI may be referred to as a first composite signal and a second composite signal, wherein the first and the second composite signals including portions of the first LIDAR input signal and portions of the reference signal. The output light signals associated with the two arms of the second MMI may be referred to as a third composite signal and a fourth composite signal, wherein the third and the fourth composite signals including portions of the second LIDAR input signal and portions of the second reference signal.

The first composite signal may couple into a first detector waveguide 723, the second composite signal may couple into a second detector waveguide 724, the third composite signal may couple into a third detector waveguide 726 and the fourth composite signal may couple into a fourth detector waveguide 727. The first detector waveguide 723 may then transmit the first composite signal to the first light sensor 728, the second detector waveguide 724 may transmit the second composite signal to the second light sensor 729, the third detector waveguide 726 may transmit the third composite signal to the third light sensor 730 and the fourth detector waveguide 727 may transmit the fourth composite signal to the fourth light sensor 731.

Each light sensor may then convert the corresponding composite optical signal into a respective electrical signal. For example, the first light sensor 728 may then convert the first composite signal into a first electrical signal. As another example, the second light sensor 729 may convert the second composite signal into a second electrical signal. As such, the first light sensor 728 and the second light sensor 729 respectively convert the first composite signal and the second composite signal into photodetector currents that vary in time. Examples of the light sensors include photodiodes (PDs), and avalanche photodiodes (APDs).

The LIDAR chip can include a control branch (not shown) for controlling operation of the laser 705. The control branch may include a directional coupler that can couple a portion of the laser output from the output waveguide 713 into a control waveguide. The coupled portion of the laser output transmitted via the control waveguide can serve as a tapped signal. In some embodiments, other signal-tapping photonic components, such as y-junctions and/or MMIs, may be used in place of the directional coupler.

The control waveguide can carry the tapped laser signal to a control interferometer that splits the tapped signal and then re-combines different portions of the tapped signal that are respectively offset in phase with respect to each other. The control interferometer may be a Mach-Zhender interferometer (MZI) comprising two unequal arms along which the split-up portions of the input signal travel before re-combining (e.g., interfering) towards the end; however, other interferometer configurations may be used. The control interferometer signal output may be characterized by an intensity that is largely a function of the frequency of the tapped laser output. For example, the MZI may output a sinusoidal signal characterized by a fringe pattern.

The sinusoidal signal from the control interferometer can couple into an interferometer waveguide and can function as an input to a control light sensor. The control light sensor may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor is a function of the frequency of the LIDAR output signal. Other detection mechanisms can be used in place of the control light sensor.

Electronics (not shown) can operate one or more components on the chip. For instance, the electronics can be in electrical communication with and control operation of the laser 705, the light sensors, and the control light sensor. All or a portion of the electronics can be included on the chip. For instance, the chip can include electrical conductors that connect the first light sensor 728 in series with the second light sensor 729.

In some embodiments, the electronics may control the chirp frequency and/or the chirp duration of the LIDAR output signal. A measurement duration may correspond to one or more chirp durations. Each measurement duration may be referred to as a data cycle. LIDAR data can be generated for each (radial distance and/or radial velocity between the LIDAR system and a reflecting object) data cycle. For example, one data cycle may correspond to two chirp durations effectively encompassing an up-ramp chirp duration and a down-ramp chirp duration. As another example, one data cycle may correspond to three chirp durations effectively encompassing an up-ramp, a down-ramp and another up-ramp chirp duration. During each data period, the electronics may tune the chirp frequency of the LIDAR output signal. For example, during a first chirp duration, the electronics may increase the frequency of the LIDAR output signal and during a second chirp duration the electronics may decrease the frequency of the LIDAR output signal or vice versa.

When the LIDAR output signal frequency is increased during the first chirp duration, the signal travels away from the LIDAR chip and an object positioned in a sample region of a field of view may reflect light from the LIDAR output signal. At least a portion of the reflected light is then returned to the chip via one or more LIDAR input signals. During the time that the LIDAR output signal and the one or more LIDAR input signals are traveling between the chip and the reflecting object, the frequency of the LIDAR output signal exiting the output facet may continue to increase. Since a portion of the output signal is tapped as the first TM reference signal, the frequency of the first TM reference signal continues to increase. As a result, a LIDAR input signal enters the light-combining component 722 with a lower frequency than the first TM reference signal concurrently entering the light-combining component. Additionally, the further the reflecting object is located from the chip, the more the frequency of the first TM reference signal increases before a LIDAR input signal returns to the chip because the further the reflecting object is located, the greater will be the round-trip delay associated with the LIDAR imaging signal. Accordingly, the larger the difference between the frequency of the LIDAR input signal and the frequency of the first TM reference signal, the further the reflecting object is from the chip. As a result, the difference between the frequency of the LIDAR input signal transmitted via waveguide 718 and the frequency of the first TM reference signal is a function of the distance between the chip and the reflecting object.

Each of the composite signals may be based on interference between the respective LIDAR input signal and the corresponding reference TM signal within the corresponding light-combining component. For instance, a 2×2 MMI 722 can guide a first TM LIDAR input signal and the first TM reference signal over two paths near each other, causing interference and generating the first beat signal. A higher beat frequency for the corresponding composite signal indicates a higher differential between the frequencies of the corresponding LIDAR input signal and the corresponding TM reference signal. As a result, the beat frequency of the data signal is a function of the distance and/or radial velocity between the LIDAR system and the reflecting object.

The beat frequencies ($f_{LDP}$) from two or more data periods or chirp durations may be combined to generate LIDAR data that may include frequency domain information, distance and/or radial velocity information associated with the reflecting object. For example, a first beat frequency that the electronics determine from a first data period ($DP_1$) can be combined with a second beat frequency that the electronics determine from a second data period ($DP_2$) to determine a distance of the reflecting object from the LIDAR system and in some embodiments, a relative velocity between the reflecting object and the LIDAR system.

Figure 8:
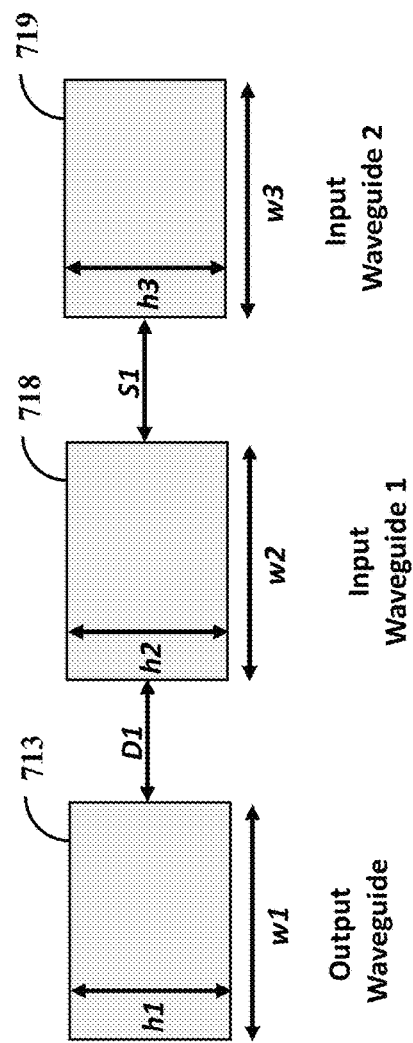
FIG. 8 shows a cross-sectional view of the waveguides of the LIDAR chip of FIG. 7.

FIG. 8 shows a cross-sectional view 800 of the waveguides of the PIC of FIG. 7 along line A-A'. Each waveguide may be characterized by a respective height (e.g., h1, h2, and h3) and a respective width (e.g., w1, w2, and w3), wherein the respective height may vary between 200 nm and 5 μm and the respective width may vary between 200 nm and 5 μm. In some embodiments, the first input waveguide 718 may be positioned at the predetermined distance D1 away from the output waveguide 713. The second input waveguide 719 may be positioned at the first separation distance S1 from the first input waveguide 218 and a total distance of (D1+S1+w2) away from the output waveguide 713. In some embodiments, D1 may approximately equal S1. The spacing between the output waveguide 713 and a closest input waveguide may vary between approximately 50 nm and 10 μm. The spacing between the input waveguides (e.g., the first input waveguide and the second input waveguide) may vary between approximately a few microns and 200 μm.

The above-described example embodiments may be recorded in non-transitory computer-readable media including program instructions to implement various operations embodied by a processing system. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer readable media may also be a distributed network, so that the program instructions are stored and executed in a distributed fashion. The program instructions may be executed by one or more processors or computational elements. The non-transitory computer readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

The invention claimed is:

1. An on-chip polarization filter, the polarization filter comprising:
   a rib waveguide configured to transmit a transverse magnetic (TM) mode and filter-out a transverse electric (TE) mode, the rib waveguide including:
   a strip; and
   a slab structure, wherein the strip is positioned directly on top of the slab structure; and wherein
   the strip comprises:
   a first curved portion; and
   a second curved portion, wherein the first curved portion and the second curved portion have a same height but different widths, and wherein the first curved portion is configured to bend downwards and the second curved portion is configured to bend upwards.

2. The polarization filter of claim 1, wherein the first curved portion and the second curved portion have respective bend radii varying between approximately 1000 μm and 8000 μm.

3. The polarization filter of claim 1, wherein the first curved portion and the second curved portion have a same bend radius of approximately 5500 μm.

4. The polarization filter of claim 3, wherein the first curved portion and the second curved portion have the width greater than approximately 1.5 μm.

5. The polarization filter of claim 4, wherein the rib waveguide is configured to transmit the TE mode with an optical loss greater than 60 dB/cm.

6. The polarization filter of claim 1, wherein the width of the first curved portion is 2 μm and the second curved portion is 3 μm.

7. The polarization filter of claim 1, wherein the height of the first curved portion and the second curved portion varies between approximately 1 μm and 1.5 μm.

8. The polarization filter of claim 1, wherein the rib waveguide is comprised of silicon, and wherein the rib waveguide is supported by an underlying buried oxide layer.

9. The polarization filter of claim 1, wherein a tapered strip section interfaces between an output of the first curved portion and an input of the second curved portion.

10. The polarization filter of claim 1, wherein an input of the first curved portion interfaces with a first straight waveguiding portion of the same width, and wherein an output of the second curved portion interfaces with a second straight waveguiding portion of the same width.

\* \* \* \* \*